(12) United States Patent
Avdimetaj et al.

(10) Patent No.: US 12,728,856 B2
(45) Date of Patent: Sep. 8, 2026

(54) METHOD AND DEVICE FOR THE AUTOMATED DRIVING OFF OF A VEHICLE AT A SIGNALING UNIT

(71) Applicant: Bayerische Motoren Werke Aktiengesellschaft, Munich (DE)

(72) Inventors: Philip Avdimetaj, Aschau (DE); Stefan Jerg, Kranzberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 5 days.

(21) Appl. No.: 18/877,576

(22) PCT Filed: Jun. 16, 2023

(86) PCT No.: PCT/EP2023/066264
§ 371 (c)(1),
(2) Date: Dec. 20, 2024

(87) PCT Pub. No.: WO2023/247355
PCT Pub. Date: Dec. 28, 2023

(65) Prior Publication Data

US 2025/0381961 A1 Dec. 18, 2025

(30) Foreign Application Priority Data

Jun. 23, 2022 (DE) ..................... 10 2022 115 718.0

(51) Int. Cl.
*B60W 60/00* (2020.01)
*B60W 30/16* (2020.01)
(Continued)

(52) U.S. Cl.
CPC .... *B60W 30/18027* (2013.01); *B60W 30/162* (2013.01); *B60W 50/14* (2013.01);
(Continued)

(58) Field of Classification Search
None
See application file for complete search history.

(56) References Cited

U.S. PATENT DOCUMENTS

2013/0191003 A1* 7/2013 Hahne ................... B60W 50/14 701/99
2015/0039350 A1* 2/2015 Martin ............... G06Q 30/0261 705/4

(Continued)

FOREIGN PATENT DOCUMENTS

DE 198 38 818 A1 3/2000
DE 10 2011 121 442 A1 6/2013

(Continued)

OTHER PUBLICATIONS

"Rechtsfolgen zunehmender Fahrzeugautomatisierung", Bundesanstalt fuer Strassenwesen (BASt) [German Federal Highway Research Institute], Forschung kompakt [Research News], Edition Nov. 2012 with English Abstract (2 pages).

(Continued)

*Primary Examiner* — James M Mcpherson
(74) *Attorney, Agent, or Firm* — Crowell & Moring LLP

(57) ABSTRACT

A description is given of a device for operating a driving function for the automated longitudinal guidance of a vehicle at a signaling unit. The device is configured to determine that the vehicle standing at the signaling unit is able to perform an automated driving-off maneuver. The device is further configured to ascertain gaze information in relation to the gaze direction of the driver of the vehicle and to bring about or to prevent the automated driving-off maneuver based on the gaze information.

8 Claims, 2 Drawing Sheets

(51) Int. Cl.
*B60W 30/18* (2012.01)
*B60W 50/14* (2020.01)

(52) U.S. Cl.
CPC ..... *B60W 60/0015* (2020.02); *B60W 2520/10* (2013.01); *B60W 2540/215* (2020.02); *B60W 2540/225* (2020.02); *B60W 2540/229* (2020.02); *B60W 2552/53* (2020.02); *B60W 2554/4041* (2020.02); *B60W 2555/60* (2020.02); *B60W 2720/106* (2013.01); *B60W 2754/30* (2020.02)

(56) References Cited

U.S. PATENT DOCUMENTS

| | | | | |
|---|---|---|---|---|
| 2015/0232026 | A1* | 8/2015 | Lueke | B60W 50/14<br>701/1 |
| 2018/0319408 | A1* | 11/2018 | Hoetzer | B60W 50/14 |
| 2019/0171211 | A1* | 6/2019 | Jang | B60W 50/0098 |
| 2019/0362166 | A1* | 11/2019 | Zeisler | G06V 20/584 |
| 2020/0184238 | A1* | 6/2020 | Kobayashi | G06V 40/161 |
| 2020/0231182 | A1* | 7/2020 | Oba | B60W 60/0053 |
| 2021/0171036 | A1* | 6/2021 | Kohlhuber | G08G 1/09623 |
| 2023/0347903 | A1* | 11/2023 | Katz | G06V 20/597 |

FOREIGN PATENT DOCUMENTS

| | | | |
|---|---|---|---|
| DE | 10 2015 208 432 | A1 | 3/2016 |
| DE | 10 2015 224 555 | A1 | 6/2017 |
| DE | 10 2018 205 753 | A1 | 10/2019 |
| WO | WO 2014/053134 | A1 | 4/2014 |

OTHER PUBLICATIONS

"(R) Taxonomy and Definitions for Terms Related to Driving Automation Systems for On-Road Motor Vehicles", Surface Vehicle Recommended Practice, SAE (Society of Automotive Engineering) International, J3016TM, Sep. 2016, pp. 1-30 (30 pages).

International Search Report (PCT/ISA/210) issued in PCT Application No. PCT/EP2023/066264 dated Aug. 30, 2023 with English translation (5 pages).

German-language Written Opinion (PCT/ISA/237) issued in PCT Application No. PCT/EP2023/066264 dated Aug. 30, 2023 with English translation (10 pages).

German-language Search Report issued in German Application No. 10 2022 115 718.0 dated Feb. 28, 2023 with partial English translation (12 pages).

* cited by examiner

METHOD AND DEVICE FOR THE AUTOMATED DRIVING OFF OF A VEHICLE AT A SIGNALING UNIT

BACKGROUND AND SUMMARY

The invention relates to a device and a corresponding method for operating a driving function of a vehicle at a signaling unit.

A vehicle can have one or more driving functions, which assist the driver of the vehicle in the guidance, in particular in the longitudinal guidance and/or the lateral guidance, of the vehicle. One exemplary driving function for assisting the longitudinal guidance of a vehicle is the adaptive cruise control (ACC) function, which can be used to longitudinally guide the vehicle at a defined set or target driving speed and/or at a defined set or target distance to a leading vehicle driving in front of the vehicle. The driving function can also be used in connection with a signaling unit (in particular a traffic signal) at a traffic node point (such as an intersection) in order to effectuate automated longitudinal guidance, such as automated deceleration, at the signaling unit.

The present document relates to the technical problem of increasing the level of comfort of a driving function for automated longitudinal guidance of a vehicle at a signaling unit in a safe manner.

The object is achieved by each of the independent claims. Advantageous embodiments are described, inter alia, in the dependent claims. It is to be noted that additional features of a claim dependent on an independent claim, without the features of the independent claim or in combination with only a subset of the features of the independent claim, can form a separate invention independent of the combination of all features of the independent claim, which can be made the subject matter of an independent claim, a divisional application, or a subsequent application. This applies in the same manner to technical teachings described in the description, which can form an invention independent of the features of the independent claims.

According to one aspect, a device for operating a driving function for automated longitudinal guidance of a (motor) vehicle at a signaling unit (for example, at a light signaling system, such as a traffic signal, or at a traffic sign) is described. The driving function can be designed to longitudinally guide the vehicle in an automated manner using a distance and/or speed controller. The vehicle can be caused in an automated manner to decelerate at a signaling unit (for example, at a red traffic signal), in order to come to a standstill at the stopping line of the signaling unit.

The device is configured to determine that the vehicle standing at the signaling unit can carry out an automated driving off maneuver. The device can be configured in this context to acquire surroundings data with respect to the signaling unit and/or with respect to the surroundings of the vehicle arranged in front of the vehicle in the direction of travel by means of one or more surroundings sensors (for example, by means of a camera) of the vehicle. On the basis of the surroundings data, the signaling status (for example, the displayed color) of the signaling unit can be determined. It can then be determined in a reliable manner on the basis of the signaling status of the signaling unit that the vehicle standing at the signaling unit can carry out an automated driving off maneuver (for example, because a phase change from red to green was recognized).

It can optionally be checked on the basis of the surroundings data whether or not the vehicle is standing as the first vehicle and/or directly at the stopping line of the signaling unit. It can be determined (possibly only then) that the vehicle can carry out an automated driving off maneuver when it has been recognized that the vehicle stands as the first vehicle and/or directly at the stopping line of the signaling unit. Otherwise (alternatively), an automated following travel function of the vehicle can be effectuated with respect to a leading vehicle arranged in front of the vehicle.

The device is furthermore configured to ascertain viewing information with respect to the viewing direction of the driver of the vehicle. The device can be configured in particular to acquire sensor data with respect to the driver of the vehicle by means of one or more driver sensors (for example, by means of an interior camera). The viewing information can then be ascertained in a precise manner on the basis of the sensor data of the one or more driver sensors and on the basis of the surroundings data. It can be ascertained as viewing information whether and possibly over which period of time the driver observes the signaling unit.

Furthermore, the device is configured to effectuate or suppress the automated driving off maneuver in dependence on the viewing information. In the context of the automated driving off maneuver, it is possible to cause the vehicle to accelerate in an automated manner to a target or set speed and/or to be longitudinally guided in an automated manner with a target or set distance to the leading vehicle driving in front of the vehicle. Alternatively or additionally, in the context of the automated driving off maneuver, the vehicle can be accelerated and then longitudinally guided in an automated manner using a distance and/or speed controller.

The device thus enables the driver of a vehicle to effectuate automated driving off of the vehicle at a signaling unit (possibly solely) by the viewing direction. The automated driving off maneuver can typically be aborted at any time by the driver (for example, by actuating the brake pedal of the vehicle). The level of comfort of the driving function can thus be increased in a safe manner.

The device can be configured to determine on the basis of the viewing information whether or not the driver has perceived the signaling unit, in particular the signaling status (such as the color) of the signaling unit. For example, the duration for which the driver observes the signaling unit can be ascertained as viewing information. It can then be determined in a reliable manner on the basis of the duration whether the driver has perceived the signaling unit, in particular the signaling status of the signaling unit (if the duration is greater than a time threshold value) or not (if the duration is less than the time threshold value).

The automated driving off maneuver can be effectuated (possibly only then) if it is determined that the driver has perceived the signaling unit, in particular the signaling status of the signaling unit. Otherwise, the automated driving off maneuver can be suppressed if it is determined that the driver has not perceived the signaling unit, in particular the signaling status of the signaling unit. The level of comfort and/or safety of the driving function can thus be further increased.

The device can be configured, if it is determined that the driver has not perceived the signaling unit, in particular the signaling status of the signaling unit, to output an (acoustic, optical, and/or haptic) driving off notification to the driver via a user interface (of the vehicle) to the effect that an automated driving off maneuver can be carried out. The output of the driving off notifications can possibly be suppressed if it is previously determined that the driver has perceived the signaling unit, in particular the signaling status of the signaling unit (and therefore the automated driving off maneuver can be initiated directly). The level of comfort of the driving function can thus be further increased.

Following the output of the driving off notification, the automated driving off maneuver can be effectuated in reaction to a confirmation of the driver of the driving off notification via the user interface (for example, via an operating element of the user interface). It can therefore additionally be made possible for the driver to initiate the automated driving off maneuver by an explicit input at the user interface. The level of comfort of the driving function can thus be further increased.

The device can therefore be configured to output an (acoustic, optical, and/or haptic) driving off notification to the driver to the effect that an automated driving off maneuver can be carried out. Furthermore, viewing information with respect to the viewing direction of the driver of the vehicle can be ascertained after output of the driving off notification. Viewing information can therefore be ascertained possibly before output of the driving off notification and possibly after output of the driving off notification.

The automated driving off maneuver can (possibly also) be effectuated or suppressed in dependence on the viewing information with respect to the viewing direction of the driver of the vehicle after output of the driving off notification.

It can therefore be made possible for the driver of the vehicle, after output of the driving off notification, to direct their view onto the signaling unit in order to thus initiate the automated driving off maneuver (without requiring another type of confirmation via the user interface). The level of comfort of the driving function can thus be further increased.

As already described above, the driving function described in this document can in particular be designed to longitudinally guide the vehicle in an automated manner at, and/or in connection with, a signaling unit. The driving function can be designed according to SAE level 2. In other words, the driving function can possibly provide automated driving and/or driver assistance (with respect to the longitudinal guidance) according to SAE level 2. The driving function can be restricted to the longitudinal guidance of the vehicle. The lateral guidance of the vehicle can possibly be provided manually by the driver or by a further and/or separate driving function (for example, by a lane keeping assistant) during the operation of the driving function.

In the context of the driving function, the vehicle can be longitudinally guided in an automated manner according to a set or target speed and/or according to a set or target distance to a leading vehicle driving (directly) in front of the vehicle. For this purpose, the driving function can provide a speed controller, by which the actual driving speed of the vehicle is set, in particular regulated, according to the set or target speed. Alternatively or additionally, a distance controller can be provided, by which the actual distance of the vehicle to the leading vehicle is set, in particular regulated, according to the set or target distance. If no relevant leading vehicle is present or if the leading vehicle drives faster than the set or target speed, the driving speed of the vehicle can be regulated. Alternatively or additionally, if the leading vehicle drives slower than the set or target speed, the distance of the vehicle to the leading vehicle can be regulated. The driving function can therefore be configured to provide an adaptive cruise control (ACC) driver assistance function.

The vehicle can comprise a user interface for an interaction with a user, in particular with the driver, of the vehicle. The user interface can comprise one or more operating elements which enable the user to define the set or target speed and/or the set or target distance. Alternatively or additionally, the one or more operating elements can enable the user to confirm a previously defined set and/or target speed and/or a previously defined set or target distance of the vehicle for the operation of the driving function. The one or more operating elements can be designed to be actuated by a hand and/or by a finger of the driver. Alternatively or additionally, the one or more operating elements can be arranged on a steering means (in particular on a steering wheel or a steering arm) of the vehicle.

Furthermore, the driving function can be configured to take into consideration one or more signaling units on the roadway (in particular road) and/or driving route traveled by the vehicle in the automated longitudinal guidance. A signaling unit can be intended to define the right-of-way at a node point (in particular at an intersection) of the roadway network traveled by the vehicle. The definition of the right-of-way can be changeable over time in this case (for example, at a light signal system, for example at a traffic signal system, having one or more different signal groups (each having one or more signal generators) for one or more different directions of travel of the vehicle at the node point) or can be permanently specified (for example, at a traffic sign, for example, at a stop sign).

During the operation of the driving function, data with respect to a signaling unit (at a node point) lying ahead in the direction of travel of the vehicle can be ascertained. The data can comprise map data with respect to signaling units and/or node points in the roadway network traveled by the vehicle. The map data can each comprise one or more attributes for the individual signaling units. The one or more attributes for a signaling unit can indicate or comprise:

- the type of the signaling unit, in particular whether the signaling unit is a light signaling system or a traffic sign; and/or
- the number of different signal groups (and the number of signal generators per signal group) of the signaling unit for different directions of travel and/or for different lanes at the node point of the roadway network at which the signaling unit is arranged or with which the signaling unit is associated; and/or
- the position (for example, the GPS coordinates) of the signaling unit and/or the stopping line of the signaling unit within the roadway network; and/or
- the relative distance of the stopping line to the associated signaling unit; and/or
- the relative distance and/or the relative arrangement of the individual signal generators of the signaling unit in relation to one another.

The driving function can be configured to ascertain the actual position (for example, the current GPS or GNSS coordinates) of the vehicle within the roadway network using a position sensor (for example, a GPS or GNSS receiver) of the vehicle and/or using odometry. A (for example, the closest) signaling unit on the driving route of the vehicle or at the entry to an upcoming node point can then be recognized on the basis of the map data. Furthermore, one or more map attributes can be ascertained with respect to the recognized signaling unit.

Alternatively or additionally, the data with respect to an upcoming signaling unit (at a node point) in the direction of travel of the vehicle can comprise surroundings data with respect to the signaling unit or can be ascertained based on surroundings data. The surroundings data can be acquired by one or more surroundings sensors of the vehicle. Exemplary surroundings sensors are a camera, a radar sensor, a lidar sensor, etc. The one or more surroundings data can be configured to acquire sensor data (i.e., surroundings data) with respect to the surroundings in the direction of travel in front of the vehicle.

The driving function can be configured to recognize on the basis of the surroundings data (in particular on the basis of the sensor data of a camera) that a signaling unit is arranged in front of the vehicle in the direction of travel. An image analysis algorithm can be used for this purpose, for example. Furthermore, the driving function can be configured to ascertain the type of the signaling unit (for example, light signaling system or traffic sign) on the basis of the surroundings data. Furthermore, the driving function can be configured to ascertain the (signaling) status of the signaling unit with respect to the permission to drive over the node point associated with the signaling unit on the basis of the surroundings data. In particular, the colors (green, yellow, or red) of the one or more signal groups of a light signal system can be ascertained.

The driving function can be configured to take into consideration a recognized signaling unit in the automated longitudinal guidance of the vehicle. In particular, the driving function can be configured to determine on the basis of the data with respect to the recognized signaling unit, in particular on the basis of the color of a light signal or a signal group of the signaling unit indicated by the data, whether or not the vehicle has to stop at the signaling unit, in particular at the stopping line of the signaling unit. For example, it can be recognized that the vehicle has to stop since the signal group relevant for the vehicle is red. Alternatively, it can be recognized that the vehicle does not have to stop since the signal group relevant for the vehicle is green. In a further example, it can be recognized that the vehicle has to stop since the signaling unit is a stop sign.

The driving function can furthermore be configured to cause the vehicle to be stopped in an automated manner at the recognized signaling unit if it is determined that the vehicle has to stop at the signaling unit. An automated deceleration operation (to a standstill) can be effectuated for this purpose. The vehicle can be guided in an automated manner up to or up to in front of the stopping line of the signaling unit. During the automated deceleration operation, one or more wheel brakes (for example, one or more friction brakes or one or more recuperating brakes) can be actuated by the driving function in an automated manner in order to decelerate the vehicle (to a standstill). The temporal course of the effectuated deceleration can depend on the available braking distance to the recognized signaling unit.

Alternatively or additionally, the driving function can be configured to cause the vehicle to be longitudinally guided in an automated manner past the recognized signaling unit, in particular over the stopping line of the signaling unit if it is determined that the vehicle does not have to stop at the signaling unit. The speed and/or distance regulation according to the set or target speed and/or according to the set or target distance to the leading vehicle can be continued.

The driving function can therefore be configured to provide an ACC driving function in consideration of signaling units. The driving function is also designated in this document as an urban cruise control (UCC) driving function.

The driving function can be configured to determine that the signaling status of the signal group (or the signal generator) of the signaling unit relevant for the driving maneuver of the vehicle changes (for example, while the vehicle drives toward the signal group or while the vehicle is standing at the signal group). For example, it can be recognized that a phase change from red to green takes place.

Furthermore, the driving function can be configured (in reaction to the recognized phase change) to cause information with respect to the changed signaling status of the signal group of the signaling unit to be conveyed to the driver of the vehicle. For example, it is possible to cause a symbol of the recognized signaling unit (possibly to be taken into consideration in the automated longitudinal guidance) to be displayed via an output element (in particular on a display screen) of the user interface, as long as the signal group has the color red. After recognized phase change to green, the displayed symbol can then possibly be withdrawn or the output can be ended. It can thus be conveyed to the driver of the vehicle in a reliable manner that, for example, after the standstill of the vehicle at the signaling unit, a (possibly automated) driving off operation can be effectuated (for example, by actuating an operating element of the user interface).

The term "automated driving" can be understood in the context of the document as driving with automated longitudinal or lateral guidance or autonomous driving with automated longitudinal and lateral guidance. The automated driving can involve, for example, driving for a longer time on the freeway or driving for a limited time in the context of parking or maneuvering. The term "automated driving" comprises automated driving with an arbitrary degree of automation. Exemplary degrees of automation are assisted, semiautomated, highly automated, or fully automated driving. These degrees of automation were defined by the Bundesanstalt für Straßenwesen [German Federal Highway Research Institute] (BASt) (see BASt publication "Forschung kompakt [Compact research]", issue November 2012). In assisted driving, the driver continuously executes the longitudinal or lateral guidance, while the system takes over the respective other function in certain limits. In semiautomated driving (SAD), the system takes over the longitudinal and lateral guidance for a certain period of time and/or in specific situations, wherein the driver has to continuously monitor the system as in assisted driving. In highly automated driving (HAD), the system takes over the longitudinal and lateral guidance for a certain period of time without the driver having to continuously monitor the system; however, the driver has to be capable of taking over the vehicle control in a certain time. In fully automated driving (FAD), the system can automatically manage the driving in all situations for a specific application; a driver is no longer necessary for this application. The above-mentioned four degrees of automation according to the definition of the BASt correspond to the SAE levels 1 to 4 of the norm SAE J3016 (SAE—Society of Automotive Engineering). For example, highly automated driving (HAF) corresponds to level 3 of the norm SAE J3016. Furthermore, SAE level 5 is also provided as the highest degree of automation in SAE J3016, which is not included in the definition of the BASt. SAE level 5 corresponds to driverless driving, in which the system can automatically manage all situations like a human driver during the entire journey; a driver is generally no longer required. The aspects described in this document relate in particular to a driving function or a driver assistance function designed according to SAE level 2.

According to a further aspect, a (road) motor vehicle (in particular a passenger vehicle or a truck or a bus or a motorcycle) is described which comprises the device described in this document.

According to a further aspect, a method for operating a driving function for automated longitudinal guidance of a vehicle at a signaling unit is described. The method comprises determining that the vehicle standing at the signaling unit can carry out an automated driving off maneuver (for example, because the signaling unit has a corresponding signaling status and/or because the traffic situation at the node point of the signaling unit permits this). Furthermore, the method comprises ascertaining viewing information with respect to the viewing direction of the driver of the vehicle, and effectuating or suppressing the automated driving off maneuver in dependence on the viewing information.

According to a further aspect, a software (SW) program is described. The SW program can be configured to be executed on a processor (for example, on a control device of a vehicle) and to thus carry out the method described in this document.

According to a further aspect, a storage medium is described. The storage medium can comprise an SW program, which is configured to be executed on a processor and to thus carry out the method described in this document.

It is to be noted that the methods, devices, and systems described in this document can be used both alone and in combination with other methods, devices, and systems described in this document. Furthermore, any aspects of the methods, devices, and systems described in this document can be combined with one another in a variety of ways. In particular, the features of the claims can be combined with one another in a variety of ways. Furthermore, features set forth between parentheses are to be understood as optional features.

The invention is described in more detail hereinafter on the basis of exemplary embodiments. In the figures

DETAILED DESCRIPTION OF THE DRAWINGS

As described at the outset, the present document relates to increasing the level of comfort of a driving function, in particular a driver assistance system, of a vehicle in connection with a signaling unit at a node point of the roadway traveled by the vehicle. The present document therefore relates in particular to enabling comfortable and safe automated driving off at a signaling unit.

Figure 1:
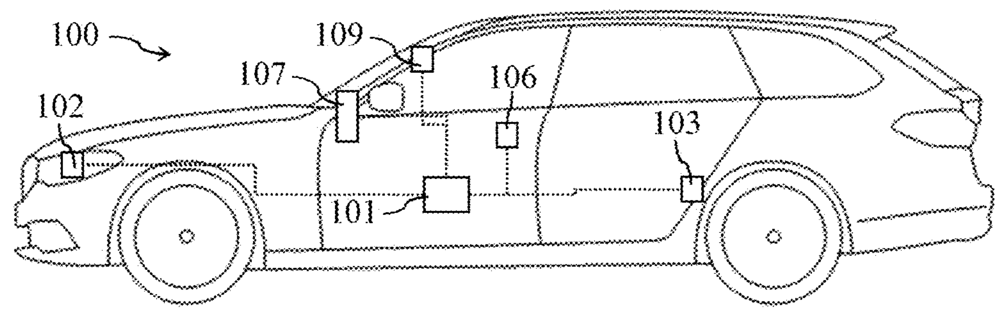
FIG. 1 shows exemplary components of a vehicle.

FIG. 1 shows exemplary components of a vehicle 100. The vehicle 100 comprises one or more surroundings sensors 102 (for example, one or more image cameras, one or more radar sensors, one or more lidar sensors, one or more ultrasonic sensors, etc.), which are configured to acquire surroundings data with respect to the surroundings of the vehicle 100 (in particular with respect to the surroundings in the direction of travel in front of the vehicle 100). Furthermore, the vehicle 100 comprises one or more actuators 103, which are configured to act on the longitudinal guidance and/or the lateral guidance of the vehicle 100. Exemplary actuators 102 are: a braking system, a drive motor, a steering system, etc.

The (control) device 101 of the vehicle 100 can be configured to provide a driving function, in particular a driver assistance function, on the basis of the sensor data of the one or more surroundings sensors 102 (i.e., on the basis of the surroundings data). For example, an obstacle on the driving trajectory of the vehicle 100 can be recognized on the basis of the sensor data. The device 101 can thereupon actuate one or more actuators 103 (such as the braking system) in order to decelerate the vehicle 100 in an automated manner and thus prevent a collision of the vehicle 100 with the obstacle.

In the context of the automated longitudinal guidance of a vehicle 100, in addition to a leading vehicle, one or more signaling units (such as a light signal system and/or a traffic sign) on the roadway or road traveled by the vehicle 100 can be taken into consideration. In particular the signaling status of a light signal or traffic signal system can be taken into consideration, so that the vehicle 100 effectuates a deceleration to the stopping line of the traffic signal at a red traffic signal relevant for the ego (planned) direction of travel and/or accelerates (possibly again) at a green traffic signal in an automated manner.

Figure 2A:
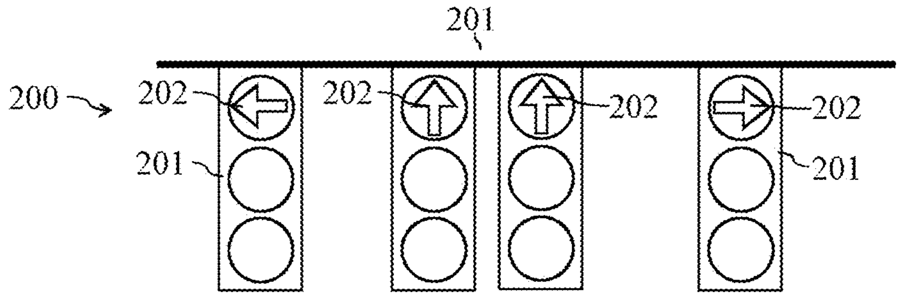
FIG. 2*a* shows an exemplary light signal system.

FIG. 2*a* shows an exemplary light signal system 200. The light signal system 200 shown in FIG. 2*a* has four different signal generators 201, which are arranged at different positions at an entry to an intersection. The left signal generator 201 has an arrow 202 to the left, and therefore indicates that this signal generator 201 applies to vehicles turning to the left. The two middle signal generators 201 have an arrow 202 upward (or no arrow 202) and therefore indicate that these two signal generators 201 apply to driving straight ahead. The individual light characters of these two signal generators 201 form signal groups. Furthermore, the right signal generator 201 has an arrow 202 to the right, and therefore indicates that this signal generator 201 applies to vehicles turning to the right.

Figure 2B:
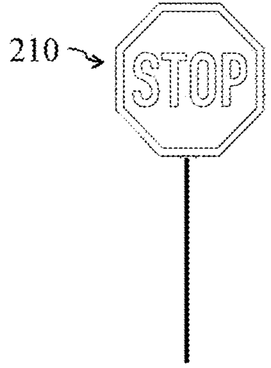
FIG. 2*b* shows an exemplary traffic sign.

FIG. 2*b* shows an exemplary stop sign as a traffic sign 210, by which the right-of-way is regulated at a traffic node point, in particular at an intersection. The (control) device 101 of the vehicle 100 can be configured to recognize a traffic sign 210 relevant for the journey of the vehicle 100 on the road or roadway traveled by the vehicle 100 on the basis of the sensor data of the one or more surroundings sensors 102 (i.e., the surroundings data) and/or on the basis of digital map information (i.e., map data).

The device 101 of the vehicle 100 can be designed to provide an automated longitudinal guidance of the vehicle 100 in the urban area. This driving function can be designated as an urban cruise control (UCC) driving function. The driving function can be provided here in an automatic mode (aUCC) and/or in a manual mode (mUCC). The driver can possibly be enabled to define via the user interface 107 of the vehicle 100 whether the driving function is to be operated in the automatic or in the manual mode.

The device 101 of the vehicle 100 can be configured to detect an upcoming signaling unit 200, 210 on the driving route of the vehicle 100 on the basis of the surroundings data of the one or more surroundings sensors 102 and/or on the basis of map data with respect to the roadway network traveled by the vehicle 100 (in conjunction with the position data of a position sensor 106 of the vehicle 100). In the manual mode of the UCC driving function, a proposal or a query can then be output via the user interface 107 as to whether or not the signaling unit 200, 210 is to be taken into consideration in the automated longitudinal guidance of the vehicle 100. The driver of the vehicle 100 can then, for example, by actuating an operating element of the user interface 107, accept or reject or ignore the proposal. On the other hand, in the automatic mode of the UCC driving function, the recognized signaling unit 200, 210 can possibly be taken into consideration automatically (i.e., without required feedback from the driver) in the automated longitudinal guidance of the vehicle 100.

If the recognized signaling unit 200, 210 is taken into consideration in the automated longitudinal guidance of the vehicle 100, an automatic deceleration can be effectuated (depending on the type and/or (signaling) status of the signaling unit 200, 210), in order to bring the vehicle 100 to a standstill in an automated manner (for example, in the case of a red traffic signal or in the case of a stop sign). Furthermore, automatic driving off of the vehicle 100 can be effectuated (for example, after a change of the (signaling) status of the signaling unit 200, 210, for example, after a change to green). The vehicle 100 can then be accelerated again in an automated manner to the set speed (in consideration of a defined minimum or target distance to a leading vehicle).

Using the UCC driving function, the driver of a vehicle 100 can therefore be enabled to use the ACC driving function even on a road having one or more signaling units 200, 210 (without having to deactivate and reactivate the ACC function at each of the individual signaling units 200, 210).

If the vehicle 100 is standing at a signaling unit 200, 210, it can be checked by the device 101 (for example, on the basis of the surroundings data) whether driving off (again) of the vehicle 100 is possible. For example, the signaling status of a light signal system 200 can be checked. Alternatively or additionally, the traffic situation at a node point can be checked (for example, in order to check whether the vehicle 100 can enter an intersection or can turn off onto another road without a collision).

If it is recognized that the vehicle 100 can drive off starting from the standstill at the signaling unit 200, 210, a driving off request (in general a driving off notification) can be output to the driver of the vehicle 100 via the user interface 107. The request can be accepted by the driver (for example, via an operating element of the user interface 107), and an automated driving off maneuver of the vehicle 100 can thereupon be effectuated.

Figure 3:
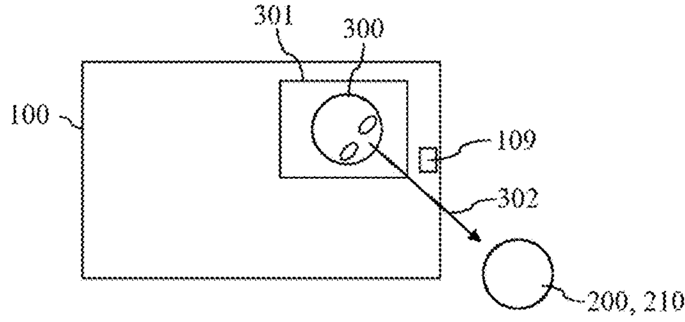
FIG. 3 shows an exemplary view recognition.

The interaction via the user interface 107 can be perceived as uncomfortable by the driver of the vehicle 100. The device 101 can be configured to acquire sensor data with respect to the driver of the vehicle 100 by means of one or more driver sensors 109 (for example, by means of an interior camera). In particular (on the basis of the sensor data of the one or more driver sensors 109), the viewing direction 302 of the driver 300 (seated at the driver position 301 of the vehicle 100) can be ascertained, as shown by way of example in FIG. 3.

The device 101 can be configured to check whether or not (upon or after recognition of the driving off option of the vehicle 100) the view of the driver 300 is directed at the signaling unit 200, 210. In particular, it can be checked whether or not the driver 300 perceives the signaling unit 200, 210, such as the signaling status of the signaling unit 200, 210.

When it is determined that the driver 300 has perceived the signaling unit 200, 210, an automated driving off maneuver can be effectuated at the signaling unit 200, 210 directly (without prior confirmation by the driver). The output of a driving off request can then possibly be omitted.

On the other hand, if it is determined that the driver 300 has not perceived the signaling unit 200, 210, a driving off request can be output via the user interface 107, and the automated driving off maneuver can be initiated (possibly only) in reaction to a confirmation of the driver 300.

The device 101 can be configured to also check the viewing direction 302 of the driver 300 after output of the driving off request. If it is recognized (on the basis of the sensor data of the one or more driver sensors 109) that the driver 300 has perceived the signaling unit 200, 210, this can be assessed as a confirmation of the driver 300 of the driving off request. In particular, an automated driving off maneuver can be initiated in this case (without the driver having to confirm the driving off request by an input via the user interface 107).

The viewing direction 302 of the driver 300 can therefore be acquired continuously via a driver monitoring unit 109. If a traffic signal 200 changing to green is recognized via the driver assistance system 101 and it is ensured at the same time that the driver has perceived the recognized color of the traffic signal 200 for a sufficiently long time via his viewing direction 302, automated driving off of the vehicle 100 can take place.

The driving off maneuver can take place with a relatively low dynamic (in particular with a relatively low acceleration), so that the driver 300 has the possibility of aborting the automated driving off maneuver, for example, by actuating the brake pedal of the vehicle 100, even before the vehicle 100 has substantially entered an intersection or another road.

The vehicle 100 can stand, for example, during a red phase at the first point at a traffic signal system 200. It can be recognized on the basis of the sensor data of the one or more driver sensors 109 that the driver 300 looks (forward) at the traffic signal system 200. Furthermore, it can be (correctly) recognized by the driver assistance system that the traffic signal turns "green", and thereupon an automated driving off maneuver can be effectuated directly. On the other hand, if it is recognized that the driver 300 looks to the right out of the side window, instead an (acoustic and/or optical and/or haptic) driving off notification can be output in order to notify the driver 300 that it is possible to drive off.

Figure 4:
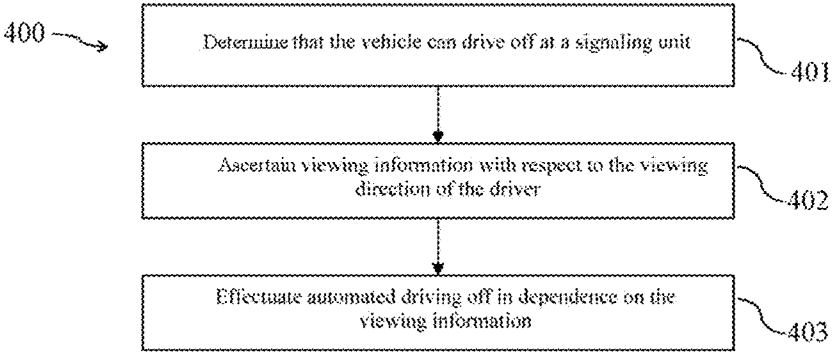
FIG. 4 shows a flow chart of an exemplary method for automated driving off of a vehicle at a signaling unit.

FIG. 4 shows a flow chart of a (possibly computer-implemented) method 400 for operating a driving function for automated longitudinal guidance of a (motor) vehicle 100 at a signaling unit 200, 210 (in particular at a light signal system 200).

The method 400 comprises determining 401 that the vehicle 100 standing at the signaling unit 200, 210 can carry out an automated driving off maneuver. For this purpose (for example, on the basis of the surroundings data) it can be checked whether or not the vehicle 100 is standing at the first point at the stopping line of the signaling unit 200, 210. The automated driving off maneuver can possibly only be carried out if the vehicle 100 is standing at the first point at the stopping line of the signaling unit 200, 210. Alternatively or additionally (on the basis of the surroundings data), the signaling status of the signaling unit 200, 210 can be ascertained (for example, the color of a light signal system 200). Based on the signaling status (for example, the color "green") of the signaling unit 200, 210, it can be determined that an automated driving off maneuver can be carried out.

It can thus be determined that the signaling status of the signaling unit 200, 210 and/or the traffic situation at the signaling unit 200, 210 enable carrying out an automated driving off maneuver.

The method 400 furthermore comprises ascertaining 402 viewing information with respect to the viewing direction 302 of the driver 300 of the vehicle 100 (for example, on the basis of the sensor data from one or more driver sensors 109 and/or on the basis of the surroundings data). As viewing information, it can be ascertained whether or not the view of the driver 300 is directed at the signaling unit 200, 210. Furthermore, the duration can be ascertained for which the driver 300 has observed the signaling unit 200, 210 (since the signaling unit 200, 210 has had a signaling status which enables automated driving off of the vehicle 100).

Furthermore, the method 400 comprises effectuating or suppressing 403 the automated driving off maneuver in dependence on the viewing information. The automated driving off maneuver can be effectuated in particular (without explicit confirmation of the driver 300, for example, via the user interface 107 of the vehicle 100) if it is recognized on the basis of the viewing information that the driver 300 has perceived the signaling unit 200, 210, in particular the signaling status of the signaling unit 200, 210.

The level of comfort of a driving function for automated longitudinal guidance at a signaling unit 200, 210 can be increased in a safe manner by the measures described in this document.

The present invention is not restricted to the exemplary embodiments shown. In particular, it is to be noted that the description and the figures are only to illustrate the principle of the proposed methods, devices, and systems by way of example.

The invention claimed is:

1. A device configured to operate a driving function for automated longitudinal guidance of a vehicle at a signaling unit, wherein the device is configured to:

determine that the vehicle at the signaling unit can carry out an automated driving off maneuver;

ascertain viewing information with respect to a viewing direction of a driver of the vehicle; and effectuate or suppress the automated driving off maneuver based on the viewing information;

determine, based on the viewing information, whether or not the driver has perceived the signaling unit including a signaling status of the signaling unit;

effectuate the automated driving off maneuver in a case in which it is determined that the driver has perceived the signaling unit including the signaling status of the signaling unit;

suppress the automated driving off maneuver in a case in which it is determined that the driver has not perceived the signaling unit including the signaling status of the signaling unit;

ascertain as the viewing information a duration during which the driver observes the signaling unit; and determine, based on the duration, whether or not the driver has perceived the signaling unit including the signaling status of the signaling unit.

2. The device according to claim 1, wherein in the case in which it is determined that the driver has not perceived the signaling unit including the signaling status of the signaling unit, the device is configured to:

output a driving off notification to the driver via a user interface that an automated driving off maneuver can be carried out; and effectuate the automated driving off maneuver in reaction to a confirmation of the driver of the driving off notification via the user interface.

3. The device according to claim 1, wherein the device is further configured to:

output a driving off notification to the driver that an automated driving off maneuver can be carried out;

ascertain the viewing information with respect to the viewing direction of the driver of the vehicle after output of the driving off notification; and effectuate or suppress the automated driving off maneuver based on the viewing information with respect to the viewing direction of the driver of the vehicle after output of the driving off notification.

4. The device according to claim 1, wherein the device is configured, in the context of the automated driving off maneuver, to effectuate that the vehicle is accelerated in an automated manner to a target speed and/or is longitudinally guided in an automated manner with a target distance to a leading vehicle driving in front of the vehicle; and the vehicle is accelerated and is then longitudinally guided in an automated manner using a distance and/or speed controller.

5. The device according to claim 1, wherein the device is further configured to:

acquire surroundings data with respect to the signaling unit and/or with respect to the surroundings of the vehicle arranged in front of the vehicle in a direction of travel via one or more surroundings sensors of the vehicle;

determine a signaling status of the signaling unit based on the surroundings status; and determine, based on the signaling status of the signaling unit, that the vehicle at the signaling unit can carry out an automated driving off maneuver.

6. The device according to claim 1, wherein the device is further configured to:

acquire surroundings data with respect to the signaling unit and/or with respect to the surroundings of the vehicle arranged in front of the vehicle in a direction of travel via one or more surroundings sensors of the vehicle;

determine, based on the surroundings data, whether or not the vehicle is standing as the first vehicle and/or directly at a stopping line of the signaling unit; and determine that the vehicle at the signaling unit can carry out an automated driving off maneuver only in a case in which it is determined that the vehicle stands as the first vehicle and/or directly at the stopping line of the signaling unit.

7. The device according to claim 1, wherein the device is further configured to:

acquire sensor data with respect to the driver of the vehicle via one or more driver sensors;

acquire surroundings data with respect to the signaling unit and/or with respect to the surroundings of the vehicle arranged in front of the vehicle in a direction of travel via one or more surroundings sensors of the vehicle; and ascertain the viewing information based on the sensor data of the one or more driver sensors and the surroundings data.

8. A method for operating a driving function for automated longitudinal guidance of a vehicle at a signaling unit, the method comprising:

determining that the vehicle at the signaling unit can carry out an automated driving off maneuver;

ascertaining viewing information with respect to a viewing direction of a driver of the vehicle;

effectuating or suppressing the automated driving off maneuver based on the viewing information;

determining, based on the viewing information, whether or not the driver has perceived the signaling unit including a signaling status of the signaling unit;

effectuating the automated driving off maneuver in a case in which it is determined that the driver has perceived the signaling unit including the signaling status of the signaling unit;

suppressing the automated driving off maneuver in a case in which it is determined that the driver has not perceived the signaling unit including the signaling status of the signaling unit;

ascertaining as the viewing information a duration during which the driver observes the signaling unit; and determining, based on the duration, whether or not the driver has perceived the signaling unit including the signaling status of the signaling unit.

* * * * *